United States Patent [19]

Issenmann

[11] Patent Number: 4,684,946

[45] Date of Patent: Aug. 4, 1987

[54] DEVICE FOR TRANSMITTING TO THE SURFACE THE SIGNAL FROM A TRANSMITTER LOCATED AT A GREAT DEPTH

[75] Inventor: Olivier Issenmann, Lamorlaye, France

[73] Assignee: Geoservices, Le Blanc Mesnil, France

[21] Appl. No.: 602,724

[22] Filed: Apr. 23, 1984

[30] Foreign Application Priority Data

May 6, 1983 [FR] France ............................. 83 07652

[51] Int. Cl.⁴ .................... G01V 1/40; G01V 3/18; E21B 49/00
[52] U.S. Cl. .................................... 340/855; 175/50
[58] Field of Search .................... 340/853–855; 455/40; 343/708, 712, 719, 790, 791; 324/369, 333, 356; 166/66; 175/50

[56] References Cited

U.S. PATENT DOCUMENTS

| 676,332 | 6/1901 | Marconi | 343/790 |
|---|---|---|---|
| 2,400,170 | 5/1946 | Silverman | 340/854 |
| 2,507,351 | 5/1950 | Scherbatshoy | 340/855 |
| 2,704,811 | 3/1955 | Walters | 343/791 |
| 2,978,637 | 4/1961 | Price et al. | 340/853 |
| 3,315,264 | 4/1967 | Bruehmann | 343/791 |
| 3,629,937 | 12/1971 | Fredricks et al. | 340/855 |
| 4,023,136 | 5/1977 | Lamensdorf et al. | 340/855 |
| 4,057,781 | 11/1977 | Scherbatshoy | 340/853 |
| 4,087,781 | 5/1978 | Grassi et al. | 340/854 |
| 4,302,757 | 11/1981 | Still | 340/854 |
| 4,494,072 | 1/1985 | Leter et al. | 324/356 |
| 4,570,123 | 2/1986 | Grosso | 324/369 |

FOREIGN PATENT DOCUMENTS

| 1224841 | 6/1960 | France | 340/853 |
|---|---|---|---|
| WO82/03277 | 9/1982 | PCT Int'l Appl. | 340/854 |
| 150952 | 2/1961 | U.S.S.R. | 324/369 |
| 0235681 | 6/1969 | U.S.S.R. | 340/854 |
| 446860 | 10/1974 | U.S.S.R. | 324/369 |

OTHER PUBLICATIONS

Wait et al., "Theory of Transmission . . . Rock", 4/79, IEEE Trans. on Geoscience Electron., vol. GB-17, #2, pp. 21–24.

Primary Examiner—Nelson Moskowitz
Attorney, Agent, or Firm—Wenderoth, Lind & Ponack

[57] ABSTRACT

A device for transmitting signals from a transmitter at the bottom of a drill well to the earth's surface including a drill collar which extends in an axial direction, a transmitter disposed in the drill collar, a cylindrical metal sleeve from forming part of an antenna for electromagnetic wave transmission, the cylindrical metal sleeve being disposed around the drill collar and connected electrically to the transmitter, the cylindrical metal sleeve having a diameter greater than the diameter of the drill collar and having an axial length shorter than the axial length of the drill collar, and an insulating sheath disposed between the cylindrical metal sleeve and the drill collar, the insulating sheath having an axial length shorter than the axial length of the drill collar.

10 Claims, 11 Drawing Figures

DEVICE FOR TRANSMITTING TO THE SURFACE THE SIGNAL FROM A TRANSMITTER LOCATED AT A GREAT DEPTH

BACKGROUND OF THE INVENTION

The present invention relates to a device for transmitting to the surface of the earth signals from a transmitter located at a great depth below the earth's surface.

There is often a problem in practice, especially in drilling carried out in search of petroleum deposits, in transmitting to the site control cabin at the earth's surface information supplied by sensors located at the bottom of the drilling well and relating to the pressure at the bottom, the density of the mud, temperature or other useful parameters.

PRIOR ART

To solve this problem, there has already been a proposal to arrange in the drill collar of the drill-pipe string, that is to say in the collar supporting the drill bit, a transmitter connected to the sensors and intended for transmitting to the earth's surface the information gathered by these sensors.

In some devices which are already known, the transmitting antenna includes a metal element formed by a portion of an actual drill collar, insulated from the latter and connected to it by a mechanical connection element made of insulating material.

Thus, for example, in a thesis submitted to the University of Lille in 1969 by Mr. Clarisse, it was proposed to divide the drill-pipe string, at the level of the last drill collar, into two portions which are separated by a bridge made of insulating material and between which an alternating electrical potential difference of specific frequency is established; the lower part of the drill collar then forming part of an antenna, and the upper portion, connected to the upper drill-pipes by means of screwing, constitutes an axis which radiates and guides toward the surface of the ground an electromagnetic wave capable of remote transmission of signals supplied by telemetering sensors located at the bottom of the drilling well.

A system of this type is also found in the article entitled "Second-generation MWD tool" published on Feb. 21, 1983 in the journal entitled: Oil & Gas Journal, especially in the last paragraph on page 86 of this publication.

The serious disadvantage of this system is that, to make an insulating connection between the two metal portions of the drill collar, it is necessary to use a hoop or insulating bridge which reduces the mechanical strength of the drill collar which, as is known, is subjected to considerable torsional and shearing forces.

Moreover, such a system is absolutely useless when it is necessary to transmit information from a drill collar immersed in an oil-drilling mud which is essentially insulating per se.

SUMMARY OF THE INVENTION

The present invention overcomes these disadvantages, and at the same time also makes it possible to supply information from the bottom of the drilling well by means for radiating electromagnetic waves of a special type carried by the drill collar, this being achieved without causing any mechanical weakening of the latter, while allowing the signals to be transmitted from the bottom of the drilling well, even when the drill collar is immersed in an oil mud which is insulating per se.

Another subject of the invention is the production of an antenna which also makes it possible to measure the resistivity of the terrain at the bottom of the well.

According to the invention, the device for transmitting signals to the earth's surface includes a cylindrical metal sleeve for forming part of an antenna for electromagnetic wave transmission connected electrically to the transmitter arranged in a known way within the drill collar together with the sensors supplying it with the parameters to be transmitted, comprising a cylindrical metal sleeve of greater diameter and shorter length than the drill collar and which is strung coaxially on the latter, being separated from it by an insulating sheathing covering the drill collar up to a certain distance from its ends.

According to a characteristic of the invention, the insulating sheathing which covers the drill collar is longer than the cylindrical sleeve forming part of the transmitting antenna.

According to another characteristic of the invention, the cylindrical sleeve is subdivided on its side adjacent to the bit, to form in the lower part of the drill collar a metal ring of small height which is connected electrically to the transmitter only when the latter is itself decoupled electrically from the other part of the sleeve.

This ring of small height makes it possible to measure the resistivity of the terrain substantially at the bottom of the well, whereas such a measurement has been practically impossible hitherto.

In the first embodiment mentioned above, there may be the disadvantage that, as a result of the wear which the cylindrical sleeve undergoes in the well because of the circulation of fragments of rock and friction on the walls of the said well, the cylindrical sleeve may be damaged to the extent of fracturing, thus giving rise to drilling problems which are themselves more important than the destruction of the cylindrical sleeve, because in some cases this can cause a reduction or even stopping of the circulation of the drilling mud and, in an extreme case, jamming of the drill-pipe string.

It is true that it could be possible to increase the thickness of the cylindrical sleeve serving as part of an antenna and make it in the form of a hollow cylinder of considerable thickness which can range up to a centimeter, but, to maintain the same outside diameter for the said cylindrical sleeve it would be necessary to reduce accordingly the thickness of the drill collar supporting it, and this will result for the latter in a reduced resistance to buckling and to compression, thus giving rise to other risks and disadvantages.

If the cylindrical sleeve is to be produced by means of netting, it is important that this should have the strength and electrical qualities required, equivalent to those of a simple sheet-metal sleeve connected electrically to the transmitter, contained in the drill collar, by means of a conductor insulated from the latter at the point where it passes through its wall.

The present invention also provides a satisfactory solution to this problem, and it is also aimed at an advantageous alternative embodiment of part of the antenna of the transmitter device, which is easy and cheap to produce, without entailing expenses involved in costly and complicated assembly to connect it to the insulating sleeve forming a dielectric between it and the drill collar, and which furthermore, if it happens to wear out, breaks down into small fragments which, far from preventing the elimination of fragments of rock resulting from drilling, are, on the contrary, easily carried along with them.

According to an essential characteristic of this embodiment of the electromagnetic wave radiating metal sleeve part of the antenna according to the invention, the said metal sleeve is accommodated in an annular groove made in the drill collar, with the outer cylindrical surface of which it is made flush when its production is completed.

The two ends of the drill color form as it were protective stops for the outer surface of the metal sleeve.

According to another characteristic of the invention, the metal sleeve consists of a cylindrical sheet of netting made of helical springs interlaced parallel to one another by means of their adjacent turns, the said netting being embedded in an electrically insulating material, for example in a hardenable plastic or in an epoxy resin of the type distributed by Messrs. CIBA-GEIGY of Basle under the protected brand name "ARALDITE", which is advantageously applied over the bottom of the annular groove made in the drill collar.

To ensure that the springs are maintained at a sufficient distance from the bottom of the annular groove made in the drill collar according to another characteristic of the invention the insulating layer is applied in two stages, the first bedding layer insulating the netting from the drill collar and serving, before it has set completely, to retain and secure the netting pressed on it.

To make it possible to ensure good electromagnetic wave transmission of the metal sleeve formed by the netting consisting of overlapping helical springs, the cylindrical sheet of helical springs has such a thickness that, after it has been laid on the first layer and incorporated in a second layer covering it completely, it projects, over approximately a third of its thickness in the radial direction, from the shell surface of the drill collar which borders on either side of the annular groove made in the said drill collar for the purpose of accommodating the metal sleeve and its dielectric.

To ensure a good connection between the first layer and the drill collar, the epoxy resin used for this purpose to constitute the first layer has advantageously incorporated in it a network of glass fibers which are advantageously twisted.

This results in reinforcement and a better adhesion of this first layer on the bottom surface of the annular groove made in the drill collar.

It is also advantageous to proceed in an identical way for securing the netting on the first layer which is not yet completely solidified.

Consequently, according to another characteristic of the invention, before being completely embedded in the second insulating layer of epoxy resin, the netting consisting of helical springs is gripped in the first still soft layer of insulating material by means of ties which are made of glass fibers advantageously twisted helically or of other sufficiently resistant synthetic fibers.

This results in a reinforcement making it easier to attach the second layer which surrounds the assembly consisting of the drill collar and the netting in the form of helical springs.

To put in contact with the outside the embedded metal part of the netting which is to form the metal sleeve according to another characteristic of the invention the second resin layer, after hardening, is machined flush with the shell surface of the drill collar which borders the annular groove in which the netting is arranged on the first layer of insulating material, separating it from the metal part of the drill collar.

This results in an insulating collar, at the surface of which appears a plurality of sections of spring turns which perform the same function as the metal sleeve.

To complete the electrical continuity of the netting embedded in the insulating resin, according to another characteristic of the invention the said netting is provided with weld points connecting the turns of two adjacent helical springs to one another at their point of intersection.

Moreover, to reinforce the electrical conductivity of the entire netting of the antenna, an oblique metal connecting wire is welded, preferably with tin, approximately every ten meshes of the netting, the said connecting wire keeping electrically connected to one another all the rows of C-shaped wire fragments, the tips of which appear at the outer surface of the second resin layer when the latter has been machined so as to be either flush with the drill collar or set back in the groove of the latter.

According to another characteristic of the invention, the metal wire connecting the metal sleeve to the transmitter located within the drill collar is either welded to one or more of the metal connecting wires or itself forms the connecting wire nearest to the electrically insulated passage orifice which is made in the drill collar to connect the metal sleeve to the transmitter.

Other characteristics and advantages of the invention will be apparent from the following description, with reference to the attached drawings which illustrate diagrammatically or simply by way of example various embodiments of the device according to the present invention.

DETAILED DESCRIPTION OF THE INVENTION

Figure 1:
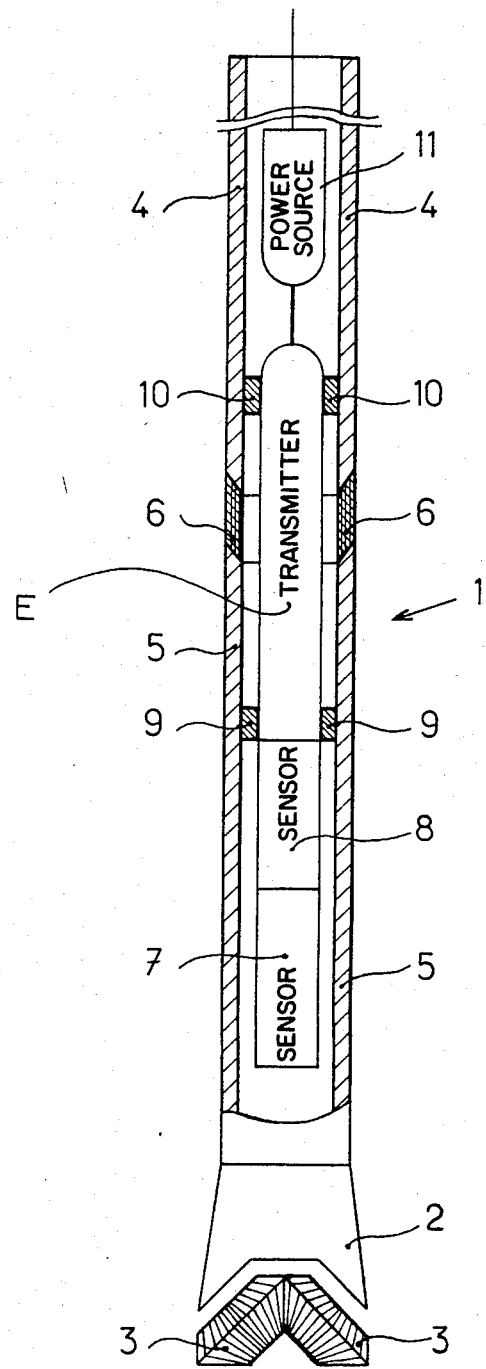
FIG. 1 is a diagrammatic view, in longitudinal section, of a known device for transmitting signals from the bottom of a drilling well.

In the known MWD (Measurement-While-Drilling), which is illustrated in FIG. 1, the drill collar of the drill-pipe string, which is designated by the general reference numeral 1, is screwed in a known way in its upper part to the following drill-pipe (not shown) of the drill-pipe string and carries, in its lower part, the bit 2 shown diagrammatically with its drilling rollers 3.

In this device, the drill collar 1 is subdivided into an upper portion 4 and a lower portion 5 coupled mechanically to one another by means of an annular assembly element 6 made of an insulating material. In this embodiment, the sensors, indicated as a whole by reference numerals 7 and 8, are retained in place, in the lower part 5 of the drill collar, by means of a metal element 9 which makes the electrical connection between the transmitter and the part 5 forming part of an antenna.

The modulator transmitter is also connected electrically to the upper part of the drill collar which is itself connected conductively to the rest of the drill-pipe string by means of a metal ring 10 arranged according to the axis of the ring 9, the said modulator transmitter E likewise being connected, in turn, to the supply batteries indicated at 11.

Such an embodiment is of great fragility because the assembly element 6, which must be electrically insulating, can be made only of materials which do not ensure satisfactory strength of the drill collar, and also because the lower part of the latter, serving as part of an antenna, can be exchanged, as a result of the considerably wear which it undergoes, only at the expense of complete replacement of the drill collar, and this details substantial dismantling costs and a considerable loss of time.

This disadvantage does not exist in the device according to the invention, which behaves in a uniform way as regards mechanical stresses and part of the antenna of which can be exchanged easily at low cost.

Figure 2:
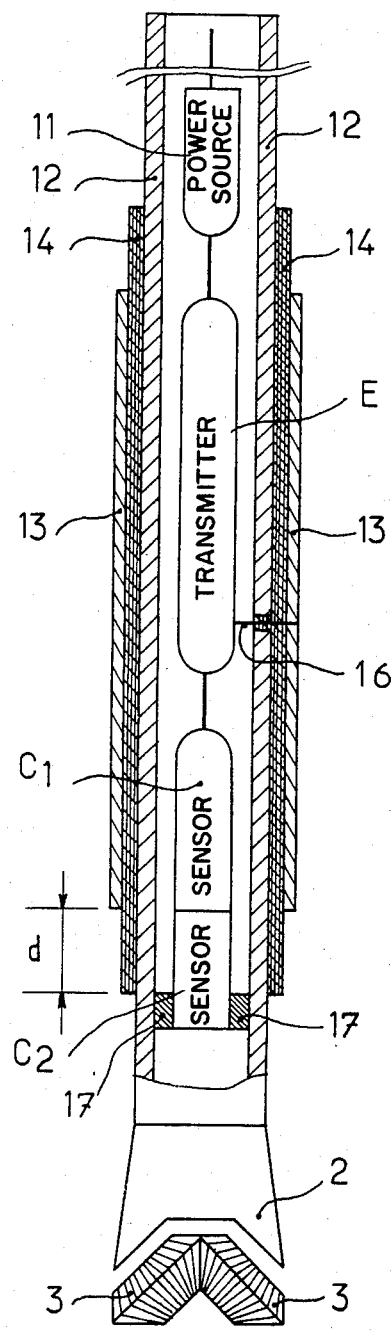
FIG. 2 is a diagrammatic view, in axial longitudinal section, of the device according to the invention.

In a first embodiment of the device according to the invention, illustrated by way of a simple example in FIG. 2 of the attached drawings, it is possible to see, again shown diagrammatically in the form of blocks, the various elements of the transmitter E which are accommodated in the drill collar 12 within leak-proof cylindrical sheaths which are wedged by rings, such as 17, and round which the drilling mud can circulate. The actual electromagnetic wave transmitting part of the antenna of the device consists of a cylindrical metal sleeve for radiating electromagnetic waves which comprises a cylindrical metal sleeve 13 possessing the physical, chemical and mechanical qualities required to withstand the various stresses exerted at the bottom of the drilling well (temperature, pressure, chemical corrosion, mechanical abrasion, etc.), the said sleeve being mounted coaxially relative to the drill collar 12, and, interposed between them, there is an insulating sleeve or liner 14 laid and immobilized by any means on the outer surface of the drill collar 12, the resistance of which is thus in no way affected.

The cylindrical metal sleeve 13 can be produced in one or more pieces from solid, perforated or slit sheet metal, gauze with metal links or the like, and it can be embedded partially or completely in the insulating liner 14 surrounding the drill collar 12.

The insulating liner 14 is advantageously made of a suitable, sufficiently resistant material, for example silicone rubber, elastomers or synthetic resins, for example reinforced with glass fibers.

This insulating liner is fixed mechanically to the outer surface of the drill collar 12 which is itself appropriately prepared for this purpose by any suitable means enabling perfect adhesion to be obtained.

According to a characteristic of the invention, the drill collar 12 and the insulating liner 14 each have at least one perforation intended for the passage of a conductor connecting the cylindrical metal sleeve 13 serving as part of an antenna to the output of the transmitter E which is incorporated within the cavity of the drill collar 12.

Figure 3:
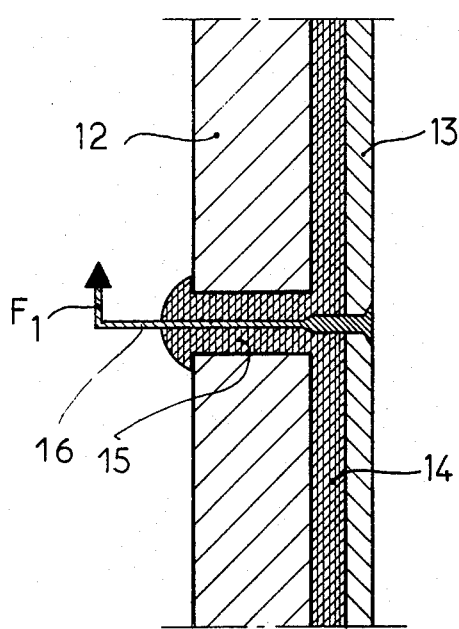
FIG. 3 is a sectional view, on a larger scale, illustrating a electrical connection between the cylindrical metal sleeve serving as part of an antenna and the transmitter output symbolised by an arrow.

At the location of this perforation, the insulating liner 14 is advantageously reinforced, according to the thickness of the drill collar 12, by an insulating element 15 penetrating within the drill collar 12, as illustrated on a large scale in FIG. 3, and the connection 16 with the transmitter E, transmitting signals from the sensors grouped in the enclosures $C_1$ and $C_2$, is symbolized by the arrow $F_1$.

As regards the insulating element 15 serving to accommodate the conductor 16 connecting the output of the transmitter E electrically to the metal sleeve 13 serving as part of an antenna, it can be in one piece with the insulating liner 14 or can consist of a separate attached element in the form of a bush which has the shape of a rivet and which incorporates a receptacle allowing a welded connection to be made between the conductor 16 and the metal sleeve 13 forming part of the transmitting antenna.

This attached element 15 can, for example, be made of a ceramic material resistant to shocks, vibrations and wear.

The insulating layer 14 must be made sufficiently thin so as not to increase too much, together with the cylindrical metal sleeve 13 also made with a relatively small thickness, the outside diameter of the drill collar 12 and so as not to disturb the conditions of circulation of the drilling mud, whether it is oily or not.

As already mentioned, the length of the insulating liner 14 must be less than that of the drill collar 12, in order to provide at the ends of the latter zones which are accessible to gripping and clamping tools.

Since the standard length of the drill collar is 9 meters, the difference in length between it and the insulating liner can vary between approximately 4 and 10% of the total length of drill collar 12, although these values are merely indicative and are in no way limiting and can vary as a function of the conditions envisaged for operating the drill-pipe string and as a function of the dielectric properties of the insulating layer 14.

As mentioned, the cylindrical metal sleeve serving as part of an antenna is made shorter than the insulating layer 14, to avoid leakage at the end of the cylindrical sleeve 13 forming part of an antenna and to prevent interference.

An advantageous embodiment is obtained by means of a cylindrical metal sleeve which is, for example, 5 meters long and one to 2 mm thick and which is centered on an insulating liner 14 which is 8 meters long. This leaves, particularly in the lower part, an uncovered zone of insulating material 14 over a length of 150 cm between the edge of the insulating material and the edge of the cylindrical metal sleeve.

This cylindrical metal sleeve is advantageously made of a metal resistant to shocks and to abrasion, which may or may not be identical to the metal constituting the drill collar 12. The uncovered part of the insulating material, which precisely must have a high resistance to abrasion, is indicated by the distance d in FIG. 2 showing the electrical diagram of the transmitter which will be discussed later.

To make the insulating liner resistant to abrasion, it is advantageous to produce it from elastomers or resins reinforced, for example, by glass fibers.

Figure 4:
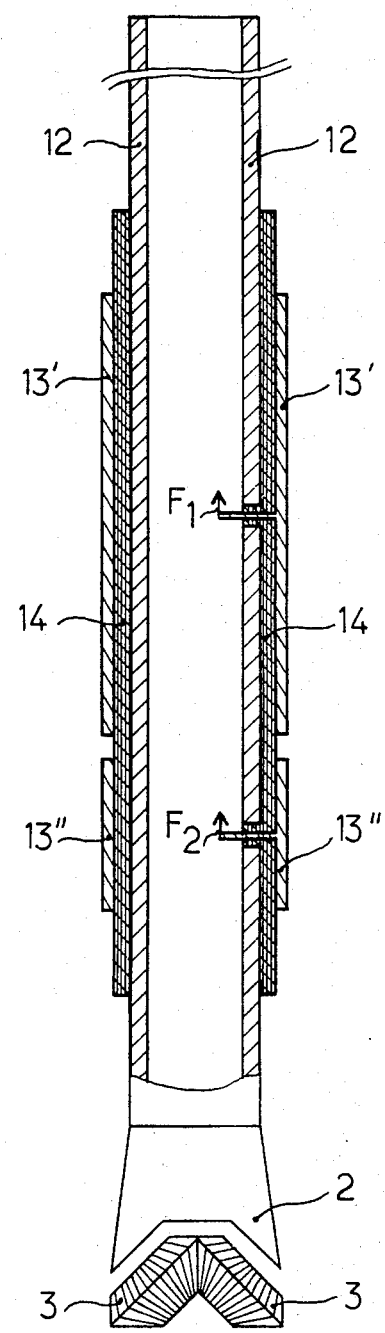
FIG. 4 is a view of an alternative embodiment of the device illustrated in FIG. 2, the cylindrical metal sleeve being subdivided to form in the lower part a metal ring which can be connected to the measuring device accommodated in the drill collar, especially for measuring the resistivity of the terrain at the depth reached during the drilling of the well.

FIG. 4 shows an alternative embodiment of the device illustrated in FIG. 2, in which the cylindrical metal sleeve 13 is subdivided mechanically and electrically into two cylindrical portions 13' and 13" of unequal length, the sleeve 13" forming a resistivity measuring means for measuring resistivity of the terrain at the bottom of the drill well in the vicinity of th transmitter comprising a ring of small width located as low as possible on the insulating liner 14 in the vicinity of the bit, that is to say substantially at the drilling level reached by the latter.

As will be seen, the transmitter E, which is not shown in detail, but is merely indicated in FIG. 4 for the sake of greater clarity, can be alternatively coupled electrically either to the sleeve 13' forming electromagnetic wave a transmission part of antenna (arrow $F_1$) or to the lower insulated metal ring 13", the special function of which will be described later.

Figure 5:
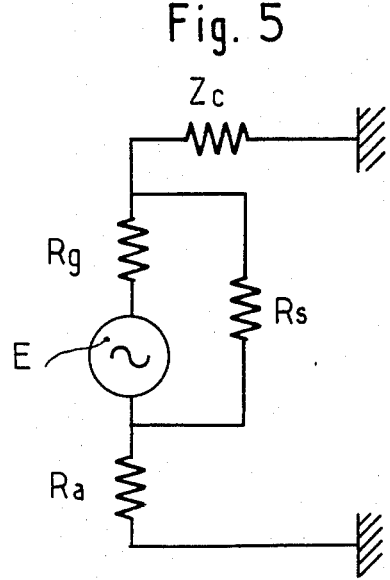
FIG. 5 is an equivalent electrical diagram of the system in which the resistance $R_s$ is the leak resistance depending on the length d illustrated in FIG. 2.

In FIG. 5, which illustrates an equivalent electrical diagram of the system, the transmitter E delivers a low-frequency alternating current, via its internal resistance $R_g$, on the one hand into the line of the drill-pipe string of impedance $Z_c$ and on the other hand into the cylindrical metal sleeve 13, of which the impedance relative to the terrain at the bottom of the well is designated by $R_a$, and, as already emphasized, the resistance $R_s$ is the leakage resistance of the currents passing directly through the drilling mud between the drill collar 12 and the cylindrical metal sleeve 13 over the part of the insulating liner 14 bared along the length d.

It is important to minimize these losses by giving the distance d the highest value possible, and to reduce the impedance $R_a$ of the cylindrical metal sleeve, to obtain the best injection of current, that is to say to maximize the height of the cylindrical metal sleeve, the best possible solution being found between the maximum size of the cylindrical metal sleeve and a minimum of leakage currents.

The transmitter device described makes it possible to operate in oil muds, the mud circulating at the bottom of the well forming the dielectric of a cylindrical capacitor, the inner armament of which is the cylindrical metal sleeve 13 and the outer armament of which is the surrounding terrain.

This embodiment makes it possible, especially by means of the ring 13" (FIG. 4), to measure the resistivity of the terrain at the level reached by the bit and to obtain from this important information for carrying out the drilling work.

This resistivity can be measured from the cylindrical metal sleeve impedance given by the formula:

$$R_a = \frac{\rho \mathrm{Log} \frac{L}{2R}}{2 \cdot L}$$

in which $\rho$ denotes the resistivity of the terrain, R the radius of the cylinder forming the cylindrical metal sleeve and L the length of the cylindrical metal sleeve.

It will therefore be seen that, to measure the resistivity accurately over a small thickness of terrain, it is useful to "focus" measurement over a narrow band; this is the reason for the embodiment shown in FIG. 4, where the ring 13" is made as short as possible and located as low as possible on the insulating liner covering the drill collar 12. Since this ring 13" is insulated electrically from the cylindrical sleeve 13' forming part of the antenna, its impedance $R_a$ relative to the ground can be measured very easily.

It was mentioned above that the metal sleeve 13 could be divided in its lower part to form a ring 13" which is used specially, when the upper cylindrical part 13' is decoupled electrically, to measure the resistivity of the zone of terrain reached by the bit at the bottom of the drilling well.

However, it is perfectly possible, according to another characteristic of the invention, to produce the cylindrical metal sleeve 13 forming the resisting measuring means, secured to the insulating casing 14 covering the drill collar 12, in the form of a plurality of cylindrical rings or collars placed side by side at a short distance from one another, and the transmitter output can be connected, by means of a programmable switching device, to one or more of the said rings so as to provide the capacitive measurement desired.

It is thus possible, by connecting only one of these rings, each time, to the device measuring the resistivity of the terrain, to carry out such measurement at several levels over practically the height of the drill collar.

Figure 6:
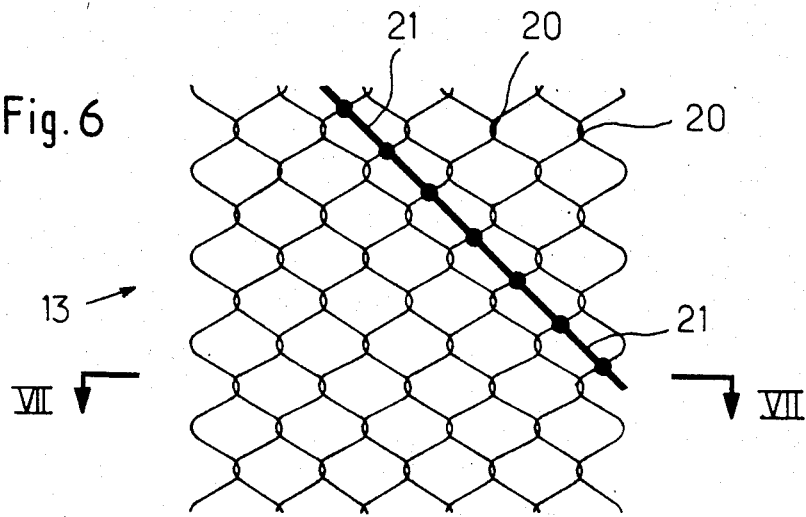
FIG. 6 is a partial diagrammatic plan view of the cylindrical metal sleeve in the form of a netting, with the oblique metal wire connecting the turns.
Figure 7:
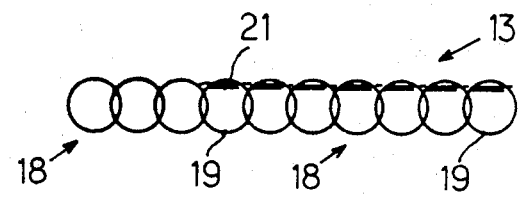
FIG. 7 is a sectional view according to VII—VII of FIG. 6.
Figure 10:
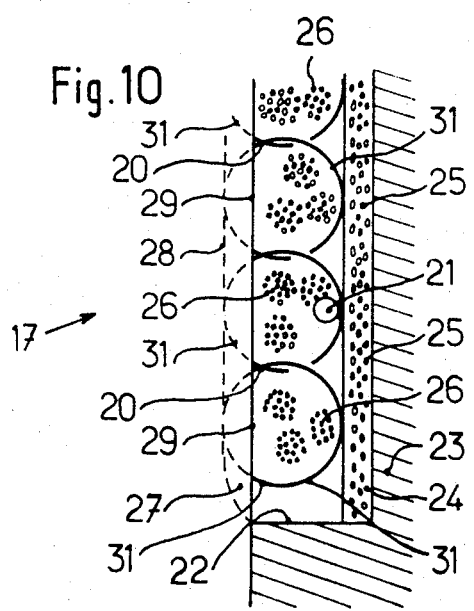
FIG. 10 is a partial view, on a larger scale, of the lower part of the drill collar, with a portion of the netting in place, the part indicated by broken lines showing the portion removed by machining to finish the cylindrical metal sleeve.
Figure 9:
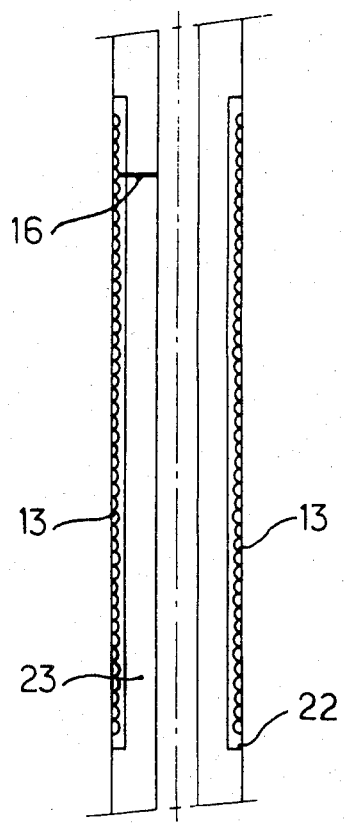
FIG. 9 is a view similar to that of FIG. 8, showing diagrammatically the netting in the form of helical springs which is used as the cylindrical metal sleeve.

In the embodiment illustrated in FIG. 6 of the drawings, there is a partial plan view of the cylindrical metal sleeve comprised of netting 13 intended to constitute part of the antenna which can be seen in FIGS. 9 and 10. As can be seen more clearly in FIG. 7, the netting 13 forming the cylindrical metal sleeve consists of a plurality of overlapping helical springs 18 with interlaced turns 19.

As can be seen on a larger scale in FIG. 10, these turns 19 are welded, for example with tin, at their points of intersection, such as 20. To ensure good electrical conductivity of the assembly as a whole and reinforce the stability of the cylindrical metal sheet 13 of springs 18, the turns 19 are connected to one another, for example over ten rows, by means of a metal wire 21 welded to them (see FIGS. 6 and 7).

The netting 13 incorporated in an electrically insulating material, for example consisting of synthetic material or more particularly an epoxy resin, the hardening time of which can advantageously be adjusted, is accommodated (FIG. 10) in an annular groove 22 of suitable length which is made in the drill collar 23. A first layer 24 of epoxy resin, advantageously reinforced with a network or sheet of glass fibers 25 which are, for example, wound helically to form a hoop, is first placed in this annular groove.

Although, in FIG. 10 of the drawings, the sheet of helical springs has been placed relatively near to the edges of the annular groove 22 made in the drill collar 23, it is advantageous if the insulating layer filling the said groove projects considerably on either side of the incorporated netting.

The sheet of helical springs 18 is laid on the first layer 24 of epoxy resin, which is not yet hardened completely, by means of a sheet or ribbon of glass fibers 26 which can be twisted and knotted to reinforce the penetration of the netting 13 forming the cylindrical metal sleeve into this still soft first layer 24, before it is advantageously covered completely with a second layer 27 of epoxy resin which then projects on the outside of the drill collar 23.

When this second layer 27 covering the netting 13 has hardened completely and is integral with the first layer 24 of epoxy resin, the outer surface 28 of the collar produced in this way is machined, the turns 19 of the netting 13 being flush with the outer surface of this collar.

By leveling off up to the unbroken line 29 visible in FIG. 10, that is to say up to the level of the shell surface of the drill collar 23, the part represented by broken lines in the drawing is thus eliminated.

Figure 11:
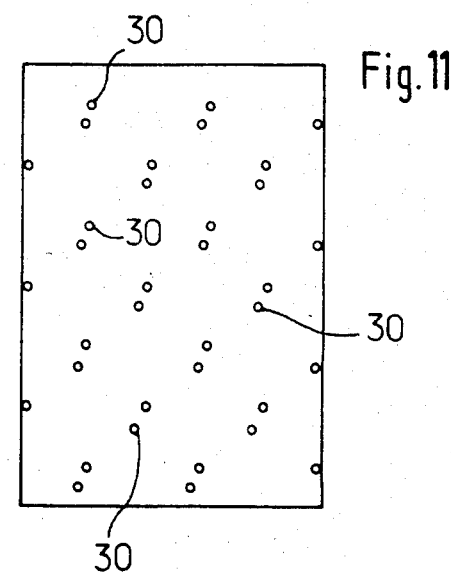
FIG. 11 is a diagrammatic plan view of the surface of the finished cylindrical metal sleeve, making it possible to see the ends of the C-shaped portions, welded to one another, which are illustrated in FIG. 8.
Figure 8:
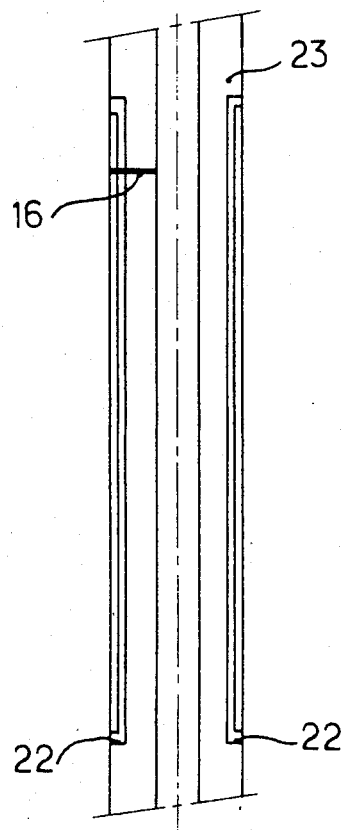
FIG. 8 is a partial diagrammatic view of the drill collar, showing in spatial terms how the cylindrical metal sleeve forming part of the antenna, with its conductor wire connecting it to the transmitter, is installed in the annular groove of the drill collar.

This results in a cylindrical metal sleeve surface which has the appearance shown in FIG. 11, in which the small circles designated by reference numeral 30 represent the ends of the C-shaped parts or fractions of turns 31 which are embedded in the two layers 24 and 27 of epoxy resin.

Before being assembled, the cylindrical metal sleeve is, of course, connected electrically to the transmitter (not shown), which is accommodated in the drill collar 23, by means of a metal connecting wire designated by the reference numeral 16 in FIGS. 3 and 4.

It goes without saying that the device has been described and illustrated only in a purely explanatory and in no manner limiting way and that various detailed modifications could be made to the embodiments described, without thereby departing from the scope of the invention.

Thus, in particular, it would also be possible to place in the annular groove 22 of the drill collar 23 not a netting, but a smooth, perforated, slit or suchlike metal sheet, as illustrated diagrammatically in FIG. 3, and also to provide several successive grooves to receive either a cylindrical metal sleeve in the form of several rings or cylindrical metal sleeve and a ring for measuring the resistivity at the drilling level.

What is claimed is:

1. A device for transmitting signals from a transmitter at the bottom of a drill well to the earth's surface including means for transmitting signals from the transmitter at the bottom of the drill well to the earth's surface, said means comprising:
   a drill collar which extends in an axial direction;
   said transmitter disposed in said drill collar;
   a cylindrical metal sleeve for forming part of an antenna for electromagnetic wave transmission, said cylindrical metal sleeve being disposed around said drill collar and connected electrically to said transmitter, said cylindrical metal sleeve having a diameter greater than the diameter of said drill collar and having an axial length shorter than the axial length of said drill collar;
   an insulating sheath disposed between said cylindrical metal sleeve and said drill collar, said insulating sheath having an axial length shorter than the axial length of said drill collar; and
   resistivity measuring means for measuring the resistivity of the terrain at the bottom of the drill well in the vicinity of said transmitter, said resistivity measuring means comprising a metal ring surrounding said insulating sheath, said metal ring having an axial length which is shorter than the axial length of said cylindrical metal sleeve, said metal ring being disposed axially between said cylindrical metal sleeve and an end of said drill collar to which a drill bit is attached, said cylindrical metal sleeve and said metal ring being connected to said transmitter by connection means for selectively electrically connecting either said cylindrical metal sleeve or said metal ring to said transmitter.

2. A device for transmitting signals from a transmitter at the bottom of a drill well to the earth's surface including means for transmitting signals from the transmitter at the bottom of the drill well to the earth's surface, said means comprising:
   a drill collar which extends in an axial direction;
   said transmitter disposed in said drill collar;
   a cylindrical metal sleeve for forming part of an antenna for electromagnetic wave transmission, said cylindrical metal sleeve being disposed around said drill collar and connected electrically to said transmitter, said cylindrical metal sleeve having a diameter greater than the diameter of said drill collar and having an axial length shorter than the axial length of said drill collar; and
   an insulating sheath disposed between said cylindrical metal sleeve and said drill collar, said insulating sheath having an axial length shorter than the axial length of said drill collar, an annular groove being provided in the outer peripheral surface of said drill collar and said insulating sheath and said cylindrical metal sleeve being disposed in said annular groove with the outer peripheral surface of said cylindrical metal sleeve being of a diameter no greater than the diameter of the outer surface of said drill collar, said cylindrical metal sleeve comprising a cylindrical metal sleeve of netting, said netting consisting of overlapping helical springs, each helical spring being interlaced with and in parallel with an adjacent helical spring to form said netting, said netting being embedded in said annular groove by means of a hardenable plastic or epoxy resin disposed between said netting and a surface of said annular groove.

3. The device as claimed in claim 2, wherein said insulating sheath comprises a first layer of insulating material applied to the surfaces of said annular groove and a second layer of insulating material applied over said netting, whereby part or all of said netting is embedded in said annular groove.

4. The device as claimed in claim 3, wherein ends of parts of said helical springs lie along the outer surface of said second layer of said insulating sheath, said ends being the portions of said helical springs remaining embedded in said insulating sheath after machining the outer surface of said second layer.

5. The device in claim 3, wherein a network of glass fibers are twisted in said first layer for reinforcing said first layer.

6. The device as claimed in claim 3, wherein ties made of glass fibers are twisted helically to space said netting from said drill collar when said netting is applied to a still soft first layer of said insulating sheath.

7. The device as claimed in claim 2, wherein adjacent said helical springs are joined together by a plurality of welds, said welds being at points where said helical springs overlap with each other.

8. The device as claimed in claim 3, wherein said netting includes at least one metal connecting wire welded to a plurality of said helical springs for maintaining electrical contact between said helical springs.

9. The device as claimed in claim 3, wherein at least one connecting wire electrically connects said helical spring forming said cylindrical metal sleeve to said transmitter.

10. A device for transmitting signals from a transmitter at the bottom of a drill well to the earth's surface including means for transmitting signals from the transmitter at the bottom of the drill well to the earth's surface, said means comprising:

a drill collar which extends in an axial direction; said transmitter disposed in said drill collar; a cylindrical metal sleeve for forming part of an antenna for electromagnetic wave transmission, said cylindrical metal sleeve being disposed around said drill collar and connected electrically to said transmitter, said cylindrical metal sleeve having a diameter greater than the diameter of said drill collar and having an axial length shorter than the axial length of said drill collar;

an insulating sheath disposed between said cylindrical metal sleeve and said drill collar, said insulating sheath having an axial length shorter than the axial length of said drill collar; and further comprising resistivity measuring means for measuring the resistivity of the terrain at the bottom of the drill well in the vicinity of said transmitter, said resistivity measuring means comprising a plurality of cylindrical rings surrounding said insulating sheath, said rings being spaced from one another along said axial direction, said rings being connected to said transmitter by a programmable switching device whereby capacitive measurements can be made for determining the resistivity of the terrain at a desired level at the bottom of the drill well.

* * * * *

UNITED STATES PATENT AND TRADEMARK OFFICE
CERTIFICATE OF CORRECTION

PATENT NO. : 4,684,946
DATED : August 4, 1987
INVENTOR(S) : Olivier Issenmann

It is certified that error appears in the above-identified patent and that said Letters Patent is hereby corrected as shown below:

On the title page Foreign Application Priority Data should read

--(30) May 6, 1983 (FR)　　France　　　　83 07652
　　　 April 10, 1984 (FR)　France　　　　84 05649 --

Signed and Sealed this

Nineteenth Day of January, 1988

Attest:

DONALD J. QUIGG

Attesting Officer　　　Commissioner of Patents and Trademarks